United States Patent [19]

Komada et al.

[11] 4,160,074

[45] Jul. 3, 1979

[54] POLYISOCYANATE FOAM HAVING ISOTROPIC CELLS AND METHOD AND APPARATUS FOR PREPARING SAME

[75] Inventors: Hiroshi Komada, Kobe; Kuniyasu Nakamura, Oosaka; Ryoichi Miyagaki, Kobe, all of Japan

[73] Assignee: Nihon Soflan Chemical & Engineering Co., Ltd., Osaka City, Japan

[21] Appl. No.: 872,678

[22] Filed: Jan. 26, 1978

Related U.S. Application Data

[63] Continuation-in-part of Ser. No. 625,526, Oct. 24, 1975, abandoned.

[30] Foreign Application Priority Data

Sep. 12, 1975 [JP] Japan ............................... 50-111453

[51] Int. Cl.² ............................................... C08J 9/00
[52] U.S. Cl. .................................. 521/155; 264/40.4; 264/54; 264/DIG. 84; 521/50
[58] Field of Search .................. 260/2.5 BC, 2.5 BD, 260/2.5 AM, 2.5 AE, 2.5 AC, 2.5 AG; 264/40.4, 54, 55, DIG. 84; 521/50, 155

[56] References Cited

U.S. PATENT DOCUMENTS

| | | | |
|---|---|---|---|
| 3,249,486 | 5/1966 | Voisinet et al. | 264/45.5 |
| 3,916,023 | 10/1975 | Porter et al. | 264/53 |

*Primary Examiner*—Melvyn I. Marquis
*Attorney, Agent, or Firm*—Blanchard, Flynn, Thiel, Boutell & Tanis

[57] ABSTRACT

A polyisocyanate foam having isotropic cells is manufactured by a foaming operation in an apparatus comprising a mold composed of side walls capable of extending and returning, or folding and unfolding, in directions perpendicular to the free rising direction. Mold extending means are provided to spread out the side walls of the mold perpendicular to the free rising direction. While the foamable composition is in a creamy state, it is allowed to rise freely in one direction (the free rising direction), while the side walls of the mold are in their folded condition, until a height detecting means is actuated. Then the side walls of the mold are unfolded to enlarge the cross-sectional area of the mold so that the foamable composition is then permitted further to expand freely in directions perpendicular to the initial free rising direction, until the foamable composition is transformed from the creamy state to the tack-free state, whereby a polyisocyanate foam product having essentially spherical isotropic cells is obtained.

13 Claims, 15 Drawing Figures

POLYISOCYANATE FOAM HAVING ISOTROPIC CELLS AND METHOD AND APPARATUS FOR PREPARING SAME

CROSS-REFERENCE TO RELATED APPLICATION

This application is a continuation-in-part of Ser. No. 625,526, filed Oct. 24, 1975 now abandoned.

This invention relates to a polyisocyanate foam possessing an essentially uniform isotropic cell structure and possessing essentially uniform physical properties in all three dimensions of length, width and height, and to a method and an apparatus for manufacturing the same.

The term "isotropic cell" and derivatives thereof means a cell whose size is essentially uniform in all directions, i.e., essentially spherical. The term "isotropic physical properties" means that the physical properties of the foam molded product are essentially uniform in all three dimensions of length, width and height.

The most common examples of polyisocyanate foams are polyurethane foams and many methods for preparing such foams are known. Normally, however, the foam has elliptical cells, the long axes of which are aligned with the direction in which the foamable composition expands during foaming. It is, however, also well-known that a number of the physical properties of the polyurethane foam are non-uniform owing to the non-isotropic cell structure. Because of this, attempts have been made to achieve an essentially isotropic cell structure. For example, a method and an apparatus for forming a polyurethane foam having an isotropic cell structure are described in U.S. Pat. No. 3,249,486 and in Japanese Patent Publication No. 28781/73. In these methods, a lid or flat plate is provided at the top of the molding container in which the polyurethane foam is formed, this lid or flat plate presses the top of the foam to prevent further upward rising thereof and thus the expansion force of the foaming composition is then effective to spread apart the side walls of the molding container, whereby more nearly isotropic cells are formed. However, the pressure imposed on the molding container is great so that it must be of sturdy construction. Also problems are encountered in releasing the foam product from the mold.

We have discovered that polyisocyanate foams having an essentially isotropic cell structure, consisting essentially of isotropic cells, can be obtained using a simple, light-weight molding container, without any problems of mold release, by allowing the foam to rise freely in one direction in the mold and then allowing the foam to expand essentially freely in at least one direction perpendicular to the initial free-rising direction of the foam. This is achieved, without placing any plates or other impediments on the top of the foam, by positively laterally extending one or more side walls of the mold and thereby enlarging the cross-sectional are of the mold as the foam expands.

SUMMARY OF THE INVENTION

Thus, the present invention provides a method for producing a polyisocyanate foam by foaming a polyisocyanate-forming composition, the foam being allowed to rise freely in one initial free-rising direction and, during foaming, positively expanding the cross-sectional area of the mold cavity in two dimensional directions perpendicular to the initial free-rising direction.

The invention further comprises an apparatus for producing a polyisocyanate foam and comprising a mold and means for enlarging the internal dimensions of the mold cavity in two directions perpendicular to the initial free-rising direction of the foam, in response to the height of the foam measured in said free-rising direction and/or with the foaming rate of the foam.

By means of the method of the invention it is possible to produce a polyisocyanate foam having substantially isotropic cells, a substantially isotropic cell structure, substantially isotropic physical properties and a relatively low specific gravity, which foam product could not be obtained by previously known methods. The invention still further consists in a rigid polyisocyanate foam having isotropic cells, an isotropic cell structure, a specific gravity of from 0.025 to 0.015 g/cm$^3$ and a dimensional change index, as determined by ASTM D-2126, in every direction of greater than 5% after conditioning the foam at 70° C. and 95% RH for 48 hours, and not greater than 1.5% after conditioning the foam at −20° C. for 48 hours.

The term "polyisocyanate foam", as used herein, means a foam produced from a starting material containing a reactive isocyanate group and thus includes, for example, polyurethane foams, polyisocyanurate foams, and polycarbodiimide foams, as well as mixtures of two or more thereof. The invention is hereafter described mainly with reference to polyurethane foams, but the same principles are applicable to other polyisocyanate foams.

In general, a polyurethane foam, whether it is to be rigid or semi-rigid, is produced as follows: a foamable composition is mixed and stirred and commences to foam to form a creamy mixture within a time period which may range from a few seconds to a few minutes; the composition gradually increases in viscosity until, after a period which may range from a few minutes to several tens of minutes, it reaches the so-called "tack-free" state in which the foam is no longer sticky to the hand; thereafter, the foaming process is completed within a period of from a few seconds to a few minutes. The shape and structure of the cells in the final foam product is determined essentially by the molding conditions imposed on the foamable composition during the period of time beginning with the formation of the creamy state, i.e., commencement of foaming, and ending when the composition achieves the tack-free state; however, the period of time from the attainment of the tack-free state to the completion of foaming and polymerization has virtually no influence on the form of the cells, because the volume of the foam increases by only a few percent during this latter time.

For this reason, it is essential that the desired shape of the cells should be achieved during the time when the foaming composition has sufficient fluidity and preferably before it becomes tack-free, i.e., preferably between the commencement of foaming and attainment of the tack-free state of the foam. This can be achieved by ensuring that, during at least the last part of the time period between the commencement of foaming and the attainment of the tack-free state, no external stress or force is exerted on the foaming foam by the walls of the mold in which the foaming is taking place by allowing the mold walls to move freely, in response to the foaming, the two mutually perpendicular directions both of which are perpendicular to the free-rising direction of the foam. We prefer that the foam should be allowed to expand in two mutually perpendicular directions (i.e. in a plane) perpendicular to the free-rising direction of the foam and we particularly prefer that the side walls of the mold should be moved apart to an equal extent in these two directions. Since the upper end of the mold is open to allow the foam to rise freely and since the foam is fluid, the pressure exerted on the foam during this period is extremely low, being only the result of its own weight, with the result being that it is possible to obtain easily a polyurethane foam whose cells are substantially isotropic. The sides of the mold may be arranged to move essentially freely by means of a simple jig, as described hereafter.

We prefer that the foam should be allowed to expand in the above-mentioned two mutually perpendicular lateral directions at a rate and/or at a time determined by the height of the foam in the initial free-rising direction; preferably, the foam is allowed to expand in the two mutually perpendicular lateral directions after it has reached a predetermined height in the mold, although it is also possible to allow the foam to expand laterally continuously as its height increases. Alternatively, the foam may be allowed to expand laterally in response to the foaming rate.

It is preferred that the small volumetric post-expansion (up to about 5 volume percent) of the foam product that occurs after the foaming composition has attained the tack-free state is performed while the side walls of the mold are maintained stationary so that this post-expansion occurs only in the initial free-rising (height) direction of the foam. At this time, the foaming composition has become highly viscous and it will not flow easily into corners, etc., if the side walls are moved farther apart. By insuring that the post-expansion occurs only in the initial free-rising direction, it is possible to avoid the formation of the foam products having a poor appearance, e.g., incompletely formed corners and edges.

A foam having isotropic cells obtained in accordance with the process of the present invention has an appearance which is very similar to that of known foams, but it has superior physical properties and it can be manufactured in a very short time, which, of course, improves productivity. It is noteworthy that the foam obtained by the process of the invention has good dimensional stability and it is possible to produce foams having much reduced densities to meet the requirements of the intended use. As a result of the reduction in density achieved by the present invention, in comparsion with prior art processes, and because of the relatively short time that is required to release the foam product from the mold in the present invention, it is possible greatly to reduce the cost of producing polyurethane or other polyisocyanate foam products.

BRIEF DESCRIPTION OF THE DRAWINGS

The invention is further illustrated with reference to the accompanying drawings, in which:

FIG. 9 is a fragmentary sectional view showing an inner mold and an outer mold fitted together just before the foaming composition is poured in;

DESCRIPTION OF THE PREFERRED EMBODIMENTS

Figure 1:
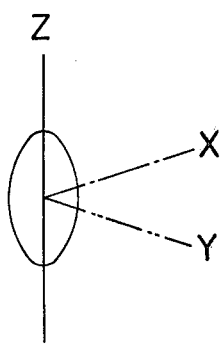
FIG. 1 is a sectional view on a plane through the free-rising direction of a cell of a conventional foam.

As may be seen from the drawings, we prefer to employ a double mold construction for use in the process of the present invention, the mold whose internal dimensions can be enlarged being the inner mold and the mold having fixed internal dimensions being the outer mold; however, the use of an outer mold is not essential to the present invention. When an outer mold is provided, the means for enlarging the internal dimensions of the inner mold preferably comprises an arm extending through a wall of the outer mold and attached to a wall of the inner mold.

Figure 2:
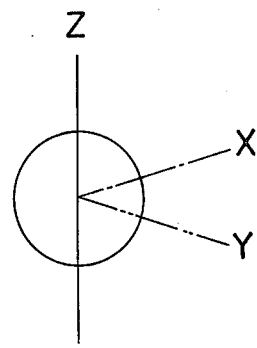
FIG. 2 is a sectional view on a plane through the free-rising direction of a cell in a foam according to the present invention.

Referring to FIG. 1 of the drawings, the profile of a conventional polyisocyanate foam cell is elliptical, with the major axis thereof extending in the free-rising direction z of the foam; this is because expansion in the x and y directions perpendicular to direction z is hindered by the walls of the mold and is thus far less than the expansion in the z direction. On the other hand, the profile of a cell in an isotropic foam produced in accordance with the present invention is, as shown in FIG. 2, essentially circular, the amount of expansion in the x and y directions being substantially the same as the amount of expansion in the z direction. Thus, the cell in FIG. 1 has the shape of an oblate spheroid, whereas the cell in FIG. 2 is essentially truly spherical.

Figure 3:
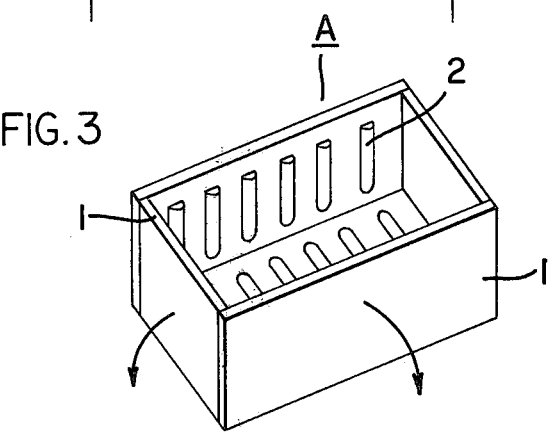
FIG. 3 is a perspective schematic view of an outer mold which is preferably used in association with the apparatus of the invention.

FIG. 3 shown an example of an outer mold A which is preferably part of the apparatus of the present invention. This outer mold has side walls 1, which are preferably detachable from each other; for example, the walls may open out, e.g. as shown in the direction of the arrows. The outer mold A is preferably provided with rollers 2 inside the outer mold, to facilitate removal and insertion of the inner mold.

Figure 4:
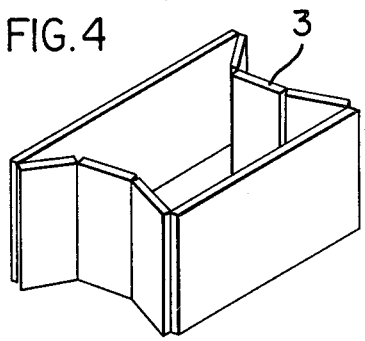
FIGS. 4 and 5 are perspective views showing portions of the inner mold, which forms an essential part of the apparatus of the present invention.
Figure 5:
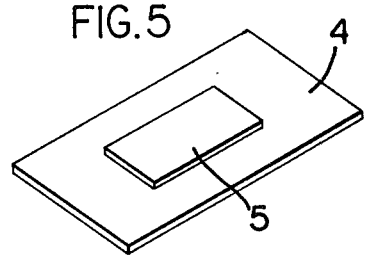
Figure 6:
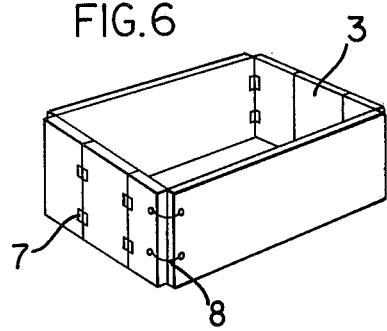
FIG. 6 is a perspective view of the same inner mold as is shown in FIG. 4, but after foaming is complete.
Figure 7:
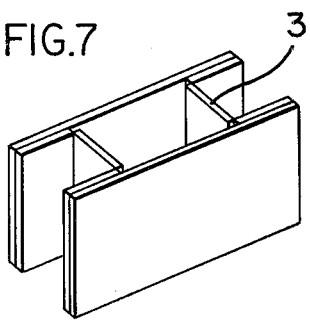
FIG. 7 is a perspective view of the same inner mold as is shown in FIG. 4, but before foaming is commenced.

The inner mold B is shown in FIGS. 4 to 7. This has side walls 3 hinged together with hinges 7 (FIG. 6) so that it can be folded and unfolded, as shown in FIGS. 4 and 7. Metal fittings 8 are provided between two adjacent walls, so that the walls can easily be separated to facilitate removal of the mold from the foam product. Bottom plate 4 (FIG. 5) has a spacer 5 projecting therefrom and conforming to the bottom opening of the inner mold B when its walls are in the contracted position shown in FIG. 7. This ensures that the foaming composition does not leak out through the bottom of the inner mold. The bottom plate 4 is preferably covered with a cushioning material 9 (FIG. 9), suitably having a thickness of from 5 to 10 mm, with the spacer 5 being mounted thereon. The bottom plate 4 or the cushioning material 9 and the spacer are preferably covered with a mold-release paper 10, to make it easier to use the inner mold B repeatedly.

The side walls 3 and bottom plate 4 of the inner mold B are preferably made of plywood of thickness about 15 mm or metal of comparable strength. Spacer 5 is suitably about 5 mm thick.

Figure 8:
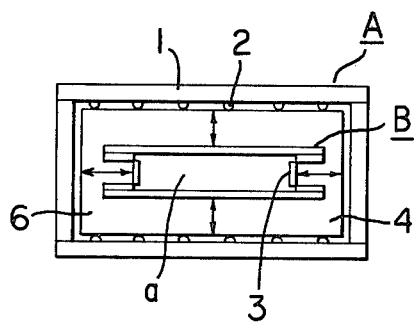
FIG. 8 is a plan view showing the inner mold of FIGS. 4 to 7 in the unopened or contracted state before foaming is commenced, disposed within the outer mold shown in FIG. 3.

The inner mold B is first folded as shown in FIG. 7 and placed into the outer mold A, in the position illustrated in FIG. 8. A space b is provided between the walls of the inner mold B, when it is in its contracted state, and the walls of the outer mold A, this space b being sufficient to allow the mold B to expand enough to produce an isotropic foam. In order to obtain a satisfactory isotropic foam, we prefer that the space a within the inner mold B should have a cross-sectional area (on a section perpendicular to the free-rising direction of the foam) of from one-third to one-quarter of the area of the mold when it is fully expanded as shown in FIG. 6 and hence that the volume of the mold before it is extended should be from one-third to one-quarter of its volume after it has been fully expanded.

Figure 9:
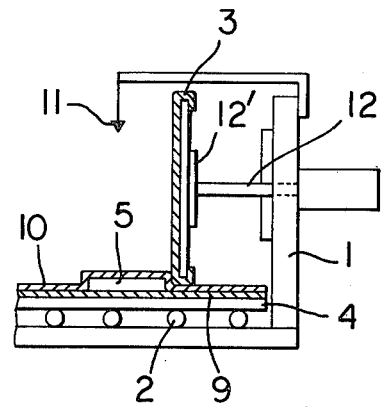

As is shown in FIG. 9, an arm 12 is attached to a wall 3 of the inner mold B, the arm passing through a wall 1 of the outer mold A. A holding plate 12' is provided in contact with the outside wall 3 of the inner mold B and is joined to the mold extending means, in the form of piston arm 12, which is provided to enlarge the inner mold B.

In the embodiment shown in FIG. 9, the arm 12 passes through the side wall of the outer mold A, but, if desired, the outer mold A may be merely a frame supporting the mold extending means. The mold extending means for moving arm 12 outwardly may be an oil pressure system or a screw system.

The mold enlarging means preferably includes a detector for detecting the height to which the foam has risen in the mold and we prefer that the detector should be arranged to actuate the mold extending means when the foam has reached a predetermined height in the mold. In the embodiment shown in the drawings, the height detector 11 is a contact detector arranged to actuate the arm 12 of the mold extending means when the foam has reached a predetermined height in the mold. When this height is reached, the arms 12 of the mold extending means pull the walls of the inner mold B toward the outer mold A, thus unfolding and expanding the cross-sectional area of the inner mold. We prefer that the detector 11 is operatively interlocked with the arms 12 of the mold extending means, so that it operates automatically to extend the inner mold B. We also prefer that the detector 11 should be pivoted or vertically movable so as to be removed immediately after the foam has been hardened.

Figure 10:
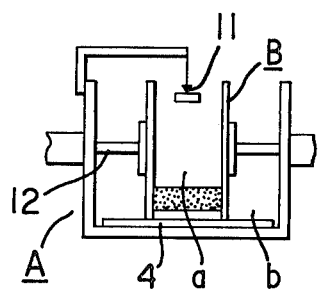
FIGS. 10, 11 and 12 are cross-sectional views showing a mold in accordance with the invention in use in the process of producing an isotropic foam.
Figure 11:
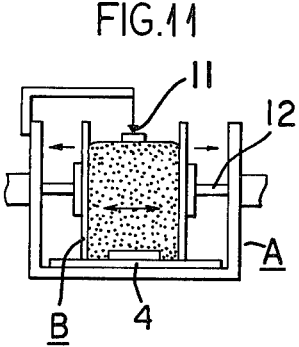
Figure 12:
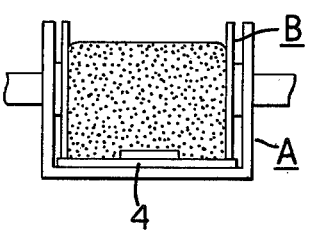

The process of the invention is carried out as follows:

First, as shown in FIG. 10, a foamable composition for preparing a polyurethane foam is charged into the space a of the inner mold B in an amount sufficient for the final foamed composition to fill the expanded volume of the inner mold, as shown in FIG. 12. Within a period which may range from a few seconds to a few minutes, the composition begins to foam and it acquires a creamy consistency. The foam expands upwards until it reaches the detector 11, which may be, for example, a limit switch, and which is located above the space a. So far, the process is essentially the same as the conventional process and the cells of the foam thus produced are generally elliptical as shown in FIG. 1. At this stage, however, the foaming composition is still fluid and capable of foaming further. Accordingly, once the foam has reached the detector 11, as shown in FIG. 11, the arms 12 of the mold extending means slide outwardly, which causes the side walls 3 of the inner mold B to open and unfold in two mutually perpendicular directions, both of which are perpendicular to the free-rising (height) direction of the foam; this unfolding of the walls of the inner mold B occurs gradually, so that the foam remains at almost the same height and remains essentially homogeneous. As a result, the foaming which previously occurred only in the free-rising (height) direction of the foam now changes so that it occurs in the two-dimensional directions perpendicular to the free-rising direction, as shown by the arrows; as a result, the cells of the foam begin to become isotropic. Foaming in the directions perpendicular to the free-rising direction (the x and y directions shown in FIGS. 1 and 2) continues to proceed until the side walls 3 of the inner mold B have reached the configuration shown in FIG. 6 and in FIG. 12. Movement of the side walls then ceases and, when foaming has stopped, which may be determined by the appearance of the foam, the completed foam is released from the mold.

The product obtained has very nearly isotropic cells and has uniform physical properties in all three-dimensional directions because the foaming in the x and y directions takes place by automatic actuation of the mold extending means 12 which are interlocked with the height detector 11. Furthermore, the time required to release the foam from the mold can be very much shortened compared with conventional processes, because the release from the mold is permitted in the method of the present invention even before the foam has been completely hardened owing to the fact that there exists in the foam product at this time only a very small amount of stress caused by the foaming pressure of the foam itself. In this connection, the conventional foams often crack when they are released from molds, caused by internal stresses present at the sides of the foam product, unless the foam product is allowed to stand in the mold for a period of from 20 to 60 minutes at room temperature after the molding process is complete. In contrast, according to the process of the invention, even if the foam product is released from the mold one or two minutes after foaming is complete, the foam obtained is not cracked because there is little or no residual foaming stress present therein. Accordingly, the process of the present invention may require less than one-tenth of the number of molds required by conventional processes for producing the same number of foam products in the same time.

Figure 13:
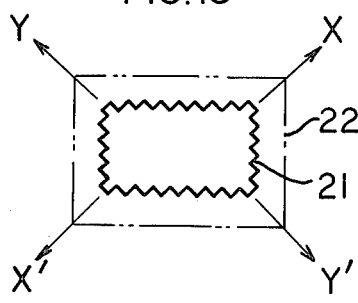
FIGS. 13 and 14 are plan and perspective views, respectively, of an alternative embodiment of inner mold for use in the present invention.
Figure 14:
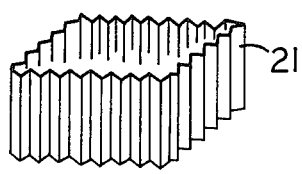
Figure 15:
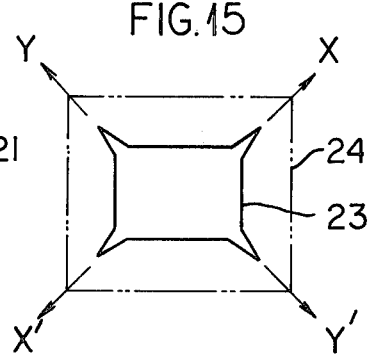
FIG. 15 is an outline plan view of yet another embodiment of inner mold for use in the present invention.

It will, of course, be appreciated that inner molds having different shapes can be used. For example, FIGS. 13 and 14 show a mold having bellows-like walls and FIG. 15 shows a mold having four foldable corners. In these cases, the mold extending means are preferably secured to the four corners of the inner mold, which is shown in the collapsed state by lines 21 and 23, respectively, and in the expanded state by lines 22 and 24.

The invention is further described with reference to the following illustrative Examples.

EXAMPLES 1 TO 5

Five solutions were prepared by mixing together the ingredients shown (in parts by weight) in following Table 1.

Table 1

| Ingredient | 1 | 2 | 3 | 4 | 5 |
|---|---|---|---|---|---|
| Polyether (sucrose derivative, OH value = 450) | 60 | 60 | 60 | 60 | 60 |
| Polyether (sucrose derivative, OH value = 550) | 40 | 40 | 40 | 40 | 40 |
| Surfactant (Silicone) | 2 | 2 | 2 | 2 | 2 |
| Amine catalyst | 0.4 | 0.4 | 0.5 | 0.7 | 1.0 |
| Foaming agent (Freon 11) | 41 | 41 | 48 | 54 | 60 |
| Total | 143.4 | 143.4 | 150.5 | 156.7 | 163 |

To each of these solutions were then added 130 parts by weight of a prepolymer (a sucrose polyether isocyanate), and the mixtures were stirred. The mixture of Example 1 was charged into a conventional mold and foamed by a conventional process, while the compositions of Examples 2, 3, 4, and 5 were charged into molds according to the present invention shown in FIGS. 3 to 12 and foamed in accordance with the process of the invention. The size of the foam products obtained was 500×1,000×2,000 mm. The physical properties of the foams thus obtained were determined and are reported in Table 2. The measurement of the dimensional change was determined by ASTM D-2126.

Table 2

| Ex. No. | Specific Gravity (g/cm³) | Direction of measurement | Compressive strength (kg/cm²) | Dimensional change (%) 100° C. 48 hr | Dimensional change (%) 70° C. 95% RH 48 hr | Dimensional change (%) −20° C. 48 hr |
|---|---|---|---|---|---|---|
| 1 | 0.0291 | H | 0.88 | +2.44 | +4.63 | −0.30 |
|   |        | V | 2.13 | −1.20 | −1.09 | −0.45 |
| 2 | 0.0284 | H | 1.38 | +0.84 | +2.49 | −0.29 |
|   |        | V | 1.42 | +0.50 | +1.23 | −0.30 |
| 3 | 0.0270 | H | 1.29 | +0.74 | +2.70 | −0.23 |
|   |        | V | 1.35 | +0.83 | +2.00 | −0.23 |
| 4 | 0.0250 | H | 1.10 | +0.96 | +3.55 | −0.10 |
|   |        | V | 1.15 | +0.96 | +2.30 | −0.12 |
| 5 | 0.0214 | H | 0.80 | +1.61 | +4.67 | −1.50 |
|   |        | V | 0.85 | +1.32 | +3.40 | −1.10 |

Note:
H represents the horizontal direction in FIGS. 10 to 12, i.e. the direction perpendicular to the free-rising direction of the foam;
V represents the vertical direction in FIGS. 10 to 12, i.e. the free-rising direction of the foam.

EXAMPLES 6 AND 7

First a solution was prepared by mixing together 30 parts by weight of a polyether (aromatic, OH value=380), 70 parts by weight of a polyether (sucrose-derivative, OH value=450), 1 part by weight of a silicone surfactant, 1 part by weight of an amine catalyst, 3 parts by weight of water and 70 parts by weight of a foaming agent (Freon 11), a total of 175 parts. A sucrose-polyether isocyanate prepolymer of 162 parts by weight was then mixed with the solution, and polyurethane foams were prepared both by a conventional method and by the process of the present invention. The physical properties of the resulting polyurethane foams were compared and are shown in Table 3. The results obtained using the conventional process are shown as Example 6, while the results obtained using the process of the invention are shown as Example 7. The measurement of the dimensional change was made in accordance with ASTM D-2126.

Table 3

| Physical properties | | | Example No. 6 | Example No. 7 |
|---|---|---|---|---|
| Specific gravity (g/cc) | | | 0.0170 | 0.0163 |
| Compressive strength (kg/cm²) | | H | 0.23 | 0.63 |
|  | | V | 0.80 | 0.63 |
| Dimensional change (%) | −20° C. 48 hr | H | −40.2 | +0.6 |
|  |  | V | −8.0 | −0.6 |
|  | 70° C. 95% RH 48 hr | H | −2.0 | +1.3 |
|  |  | V | +5.2 | −0.7 |
|  | 100° C. 48 hr | H | +3.5 | +0.8 |
|  |  | V | −2.1 | −0.7 |
| Water absorption (volume %) | | | 6.48 | 5.08 |
| Content of closed cells (volume %) | | | 76.3 | 85.3 |
| Thermal conductivity (Kcal/mhr° C.) | | | 0.0216 | 0.0190 |

As can be seen from Tables 2 and 3 above, the polyurethane foams obtained by the process of the present invention have superior physical properties, particularly the dimensional changes are more similar in both the horizontal and vertical directions, in comparison to polyurethane foams obtained by conventional processes; the more similar physical properties of the foams of the invention in the vertical and horizontal directions demonstrate that the foams obtained by the process of the invention have substantially isotropic cells.

So far we have described how foams having isotropic cells can be obtained by extending the polyurethane foam in directions perpendicular to the free-rising direction of the foam once the foam has reached a predetermined height. However, it is also possible to operate the mold extending means to enlarge the cross-sectional area of the mold in response to the foaming rate of the foaming composition. For example, this may be achieved as follows:

The mold extending means can begin to operate simultaneously with or slightly after the beginning of foaming. In this case, the detector rises as the foam expands in the z direction up to a predetermined height, while the mold extending means is operated by pulling in response to the rising detector. Once the detector has reached a predetermined height, it stops rising. It is possible, if desired, to continue to operate the mold extending means after the height detector has reached the predetermined height.

If desired, the side walls 3 of the mold may remain slightly bent slightly inwards, rather than being completely opened out, at the end point of the expansion.

In a further modification of the process hereinbefore described, the molding extending means can be independently operated after the expansion has begun so as to expand the mold at a rate predetermined by means of preliminary trials and, if desired, the mold extending means can be operated by pre-programmed control system. Although this is less accurate than the method described above wherein the mold expanding means operates by detecting directly the height in the free-rising direction, it is possible to obtain the desired cell structure by proper control of the ambient temperature, humidity, and quality of the foaming composition.

The foam manufactured by the process of the present invention has a low density and improved physical properties, especially dimensional stability. As a result, the foam is suitable for use as an insulating material but is cheaper than conventional insulating materials. The foam can be of any desired shape, for example, it may be in the form of a plate, a cube or a circular arc and, if desired, other materials can be laminated onto one or more surfaces of the foam; examples of such other materials include paper, plastic sheets, plywood, asbestos, and metal laminates. Consequently, the foam product is useful for a wide range of applications in the insulation industry.

The embodiments of the invention in which an exclusive property or privilege is claimed are defined as follows:

1. A method of manufacturing a polyisocyanate foam molded product having a substantially isotropic cell structure, utilizing a mold having a closed bottom wall, an open top and upstanding side wall means defining a mold cavity having a closed perimeter, said side wall means comprising interconnected relatively movable wall portions capable of moving horizontally to expand the cross-sectional area of the mold cavity in the two mutually perpendicular horizontal directions of width and length while maintaining the perimeter of said mold cavity closed, and extending means connected to said wall portions for positively mechanically moving said wall portions in said two mutually perpendicular horizontal directions from an inner contracted position to an outer expanded position, said bottom wall having a size such that it closes the bottom of the mold cavity in all positions of said side wall means, which comprises the steps of:

placing a charge of liquid polyisocyanate foamable composition onto said bottom wall of said mold cavity while said wall portions are in said inner contracted position;

allowing the composition freely to rise vertically in said mold cavity toward the open top thereof by expansion caused by foaming of said composition, and, while the composition is still fluid and expanding and is free of externally applied pressure on the upper surface of said composition, operating said extending means and thereby positively mechanically moving said wall portions outwardly in said two mutually perpendicular horizontal directions to similar extents to expand the cross-sectional area of the mold cavity in both the width and length directions while maintaining the perimeter of said mold cavity closed whereby the composition expands also in said two mutually perpendicular horizontal directions to form a substantially isotropic cell structure.

2. A method as claimed in claim 1, in which said wall portions are moved outwardly in said two mutually perpendicular horizontal directions in response to the vertical height of the composition in said mold cavity.

3. A method as claimed in claim 1, in which said wall portions are moved outwardly in said two mutually perpendicular horizontal directions in response to the foaming rate of the composition in said vertical direction.

4. A method as claimed in claim 1, in which said wall portions are maintained stationary in said inner contracted position until the upper surface of said composition has reached a predetermined vertical position, and then said extending means are operated to expand the cross-sectional area of the mold in both the width and length directions.

5. A method as claimed in claim 1, in which said wall portions are moved outwardly in said two mutually perpendicular horizontal directions during the period in which the foamable composition is transformed from the creamy state to the tack-free state.

6. A method as claimed in claim 5, in which when the foamable composition reaches the tack-free state, outward movement of said wall portions is stopped and said wall portions are thereafter maintained stationary during completion of expansion of the foamable composition.

7. A method as claimed in claim 1, wherein said polyisocyanate foam comprises polyurethane, polycarbodiimide, polyisocyanurate, or a mixture thereof.

8. A method as claimed in claim 1, wherein said polyisocyanate is a rigid polyurethane foam.

9. A method as claimed in claim 1, wherein a height detecting means is located in said mold cavity close to the upper end thereof and wherein said wall portions are maintained in said inner contracted position until said composition rises to a vertical level effective to actuate said height detecting means, and then initiating operation of said extending means in response to actuation of said height detecting means by the rising foaming composition.

10. A method as claimed in claim 1, wherein the cross-sectional area of said mold cavity in the contracted position thereof is about ⅓ to ¼ of the cross-sectional area of said mold cavity in the expanded position thereof.

11. A rigid polyisocyanate foam having a physical structure of substantially isotropic cells throughout and having a density of from 0.025 to 0.015 g/cm$^3$, and a dimensional change percentage in every direction, measured by ASTM D-2126, of less than 5% at 70° C. and 95% RH for 48 hr. and less than 1.5% at −20° C. for 48 hr. and a variation of compressive strength of not more than 6.5%.

12. A foam as claimed in claim 11, wherein said rigid polyisocyanate foam is a rigid polyurethane foam.

13. A polyisocyanate foam having substantially isotropic cells, a substantially isotropic cell structure, substantially isotropic physical properties and a low specific gravity, made by the method according to claim 1.

* * * * *